United States Patent
Methe et al.

(10) Patent No.: US 11,038,229 B2
(45) Date of Patent: Jun. 15, 2021

(54) TEXTURIZED REMOVABLE TAB AND BATTERY ASSEMBLY HAVING THE SAME

(71) Applicant: DURACELL U.S. OPERATIONS, INC., Wilmington, DE (US)

(72) Inventors: Jean Mary Methe, Bethel, CT (US); David Goldfarb, Bethel, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 206 days.

(21) Appl. No.: 15/606,585

(22) Filed: May 26, 2017

(65) Prior Publication Data

US 2018/0342713 A1    Nov. 29, 2018

(51) Int. Cl.
*H01M 50/153* (2021.01)
*C09J 7/29* (2018.01)
(Continued)

(52) U.S. Cl.
CPC ............ *H01M 50/153* (2021.01); *C09J 7/29* (2018.01); *H01M 12/06* (2013.01); *H01M 50/109* (2021.01); *H01M 50/147* (2021.01); *H01M 50/155* (2021.01); *H01M 50/1537* (2021.01); *H01M 50/216* (2021.01); *H01M 50/256* (2021.01); *H01M 50/598* (2021.01); *C09J 2203/33* (2013.01); *C09J 2203/334* (2013.01);
(Continued)

(58) Field of Classification Search
None
See application file for complete search history.

(56) References Cited

U.S. PATENT DOCUMENTS

D270,807 S    10/1983  Dilliner
4,649,090 A   3/1987   Oltman et al.
(Continued)

FOREIGN PATENT DOCUMENTS

CN    105024112 A    11/2015
DE    19724648 A1    12/1998
(Continued)

OTHER PUBLICATIONS

Van Kuilenburg et al. "A review of fingerpad contact mechanics and friction and how this affects tactile perception" J Engineering Triobology, 2015, vol. 229(3) 243-258. (Year: 2015).*
(Continued)

*Primary Examiner* — Alix E Eggerding
(74) *Attorney, Agent, or Firm* — Marshall, Gerstein & Borun LLP

(57) ABSTRACT

A battery assembly includes a battery and a removable tab attached to a surface of the battery. The removable tab includes a main tab layer having a first surface and an oppositely disposed second surface, wherein the main tab layer comprises a battery cell attachment region and a gripping region adjacent to the battery cell attachment region. The removable tab also includes a first layer disposed over the first surface of the main tab layer; and a second layer disposed over a portion of the second surface of the main tab layer only at the gripping region. One or both of the first layer and the second layer is a texturized layer having an average surface roughness of about 0.6 microns to about 2 microns, the texturized layer providing an external face to the removable tab.

19 Claims, 7 Drawing Sheets

(51) Int. Cl.
  *H01M 12/06* (2006.01)
  *H01M 50/109* (2021.01)
  *H01M 50/147* (2021.01)
  *H01M 50/155* (2021.01)
  *H01M 50/216* (2021.01)
  *H01M 50/256* (2021.01)
  *H01M 50/598* (2021.01)
  *H01M 50/148* (2021.01)

(52) U.S. Cl.
  CPC .... *C09J 2301/122* (2020.08); *C09J 2301/204* (2020.08); *C09J 2301/312* (2020.08)

(56) References Cited

U.S. PATENT DOCUMENTS

| | | | |
|---|---|---|---|
| 5,184,771 A * | 2/1993 | Jud | B65D 75/5844 |
| | | | 206/524.2 |
| 5,672,402 A * | 9/1997 | Kreckel | A47G 1/175 |
| | | | 428/34.2 |
| 6,329,095 B1 | 12/2001 | Farnworth et al. | |
| D553,675 S | 10/2007 | Hogg | |
| 7,405,014 B2 | 7/2008 | Bartling et al. | |
| 7,563,531 B2 | 7/2009 | Bartling et al. | |
| D774,202 S | 12/2016 | Bielitz | |
| D788,703 S | 6/2017 | Krysinski et al. | |
| 10,093,469 B2 | 10/2018 | Dorr et al. | |
| 2002/0114911 A1* | 8/2002 | Franck | A47G 1/175 |
| | | | 428/40.1 |
| 2005/0103680 A1 | 5/2005 | Nakatsu et al. | |
| 2006/0292427 A1* | 12/2006 | Bartling | H01M 2/08 |
| | | | 429/406 |
| 2012/0312833 A1 | 12/2012 | Gabathuler | |
| 2013/0015197 A1 | 1/2013 | Gauthier | |
| 2015/0027920 A1* | 1/2015 | Riordan | A61J 7/0046 |
| | | | 206/515 |
| 2016/0329536 A1 | 11/2016 | Dorr et al. | |

FOREIGN PATENT DOCUMENTS

| | | |
|---|---|---|
| JP | 2017-075231 A | 4/2017 |
| WO | WO-98/49063 A2 | 11/1998 |
| WO | WO-02/33774 A2 | 4/2002 |
| WO | WO-2004/021471 A1 | 3/2004 |
| WO | WO-2016/172676 A1 | 10/2016 |

OTHER PUBLICATIONS

International Application No. PCT/US2018/030663, International Search Report and Written Opinion, dated Aug. 9, 2018.
Duracell EasyTab Hearing Aid Batteries, downloaded from the Internet at: <https://www.duracell-me.com/products/hearing-aid-batteries/> (applicant admitted prior art).
Office Action for U.S. Appl. No. 15/606,543 OA dated May 31, 2019.
Office Action for U.S. Appl. No. 15/606,543 OA dated Dec. 11, 2019.
https://www.youtube.com/watch?v=alqn61yoe2g.; Duracell Hearing Aid Batteries, Youtube, Oct. 15, 2014 (Year: 2014).

* cited by examiner

TEXTURIZED REMOVABLE TAB AND BATTERY ASSEMBLY HAVING THE SAME

BACKGROUND

Field of the Disclosure

The disclosure relates generally to removable tabs having improved grip and battery assemblies having the same, and more particularly removable tabs having a texturized layer and battery assemblies having the same.

BRIEF DESCRIPTION OF RELATED TECHNOLOGY

Over the last 15 years, the number of individuals with hearing loss has nearly doubled. Many suffering from hearing loss are elderly, and hand function decreases with age in both men and women, especially after age 65. This loss of hand function can make it more difficult to replace hearing aid batteries, even with the use of tabs such as EasyTab® (Duracell U.S. Operations, Inc.), which are relatively long tabs that are adhered to the batteries so as to facilitate handling by consumers. Conventional hearing aid tabs, such as EasyTab®, are typically attached to the battery such that the entire top surface of the battery is covered by and adhered to the tab. Despite the fact that the relatively long tab facilitates insertion of the battery by the consumer into the hearing aid, inserting the battery in the hearing aid continues to present handling challenges, including frequent inadvertent dropping of the batteries and associated tabs, and thus can cause significant consumer frustration, particularly for elderly consumers.

SUMMARY

The disclosure provides a hearing aid battery tab that advantageously enhances gripping of the surfaces by the user during replacement of the battery. Hearing aid battery tabs in accordance with the disclosure can also provide improved tactile feedback to a user when gripping the tab. This can be particularly useful for elderly individuals or others who may be experience neuropathy or other reduced sense of touch.

In accordance with an embodiment of the disclosure, a battery assembly includes a battery having a first surface and a removable tab attached to the first surface of the battery. The removable tab includes a main tab layer having a first surface and an oppositely disposed second surface, wherein the main tab layer includes a battery cell attachment region and a gripping region adjacent to the battery cell attachment region. The removable tab further includes a first layer disposed over the first surface of the main tab layer, and a second layer disposed over a portion of the second surface of the main tab layer at the gripping region. One or both of the first layer and the second layer is a texturized layer having an average surface roughness of about 0.6 microns to about 6 microns. The texturized layer provides an external face to the removable tab.

In accordance with another embodiment of the disclosure, a removable tab for a battery cell includes a main tab layer having a first surface and an oppositely disposed second surface. The main tab layer includes a battery cell attachment region and a gripping region adjacent to the battery cell attachment region. The removable tab further includes a first layer disposed over the first surface of the main tab layer and a second layer disposed over a portion of the second surface of the main tab layer at the gripping region. One or both of the first layer and the second layer is a texturized layer having an average surface roughness of about 0.6 microns to about 6 microns.

DETAILED DESCRIPTION

Figure 1:
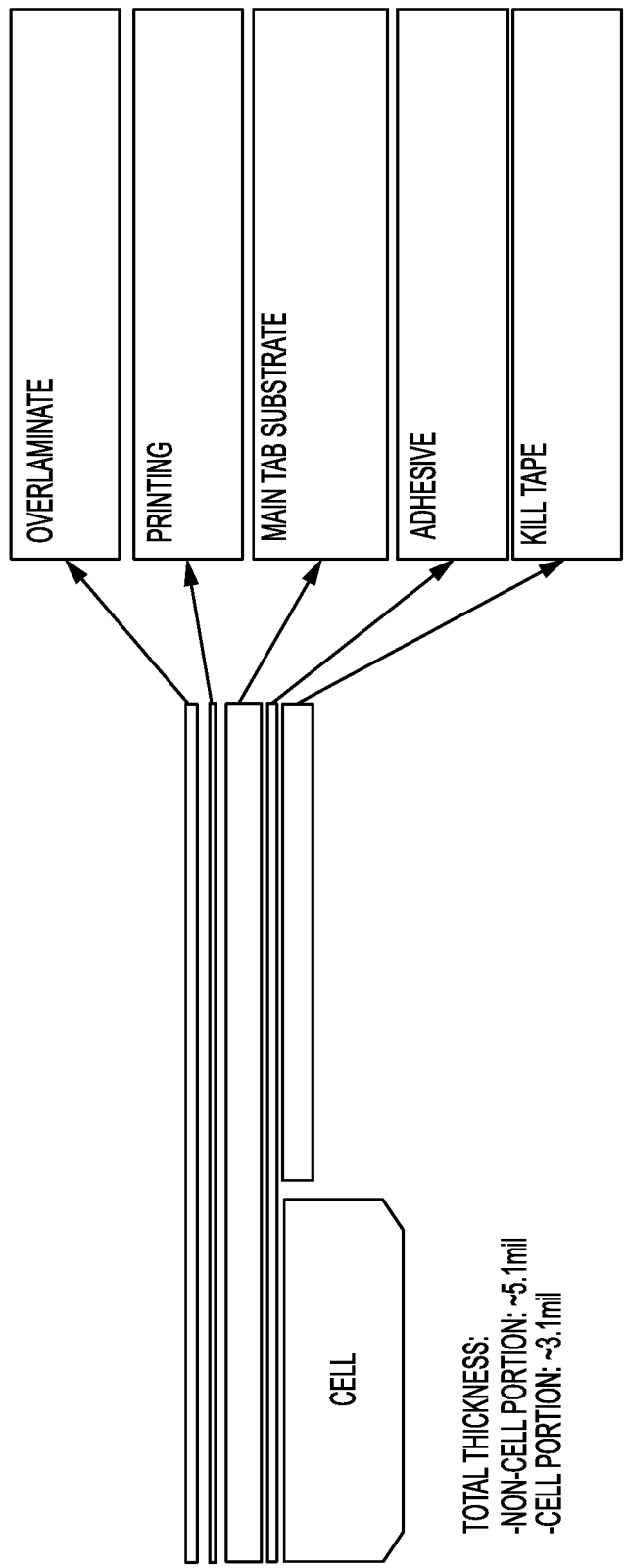
FIG. 1 is a schematic illustration of a conventional battery assembly.

A battery assembly 10 in accordance with an embodiment of the disclosure includes a battery 12 having a first surface 14 and a removable tab 16 attached to the first surface 14 of the battery 12. The removable battery tabs 16 of any of the embodiments disclosed herein can be utilized with any suitable battery type and/or size. For example, the battery can be a hearing aid battery. In one aspect, the hearing aid battery is a metal/air battery, for example, the hearing aid battery can be a zinc air button cell. Additionally, as is known in the art, button cells come in a variety of sizes. Dimensions of the removable tab 16 can be adjusted depending on the size of the battery to which it is attached. Such adjustment can include modification of the width and/or length of the battery attachment region of the tab. Additionally, or alternatively, the overall tab length can be adjusted as needed depending on the battery size. In accordance with embodiments of the disclosure, a battery assembly is provided, including the battery and a removable tab. In accordance with other embodiments, a removable tab is provided for subsequent attachment to a battery.

Figure 2:
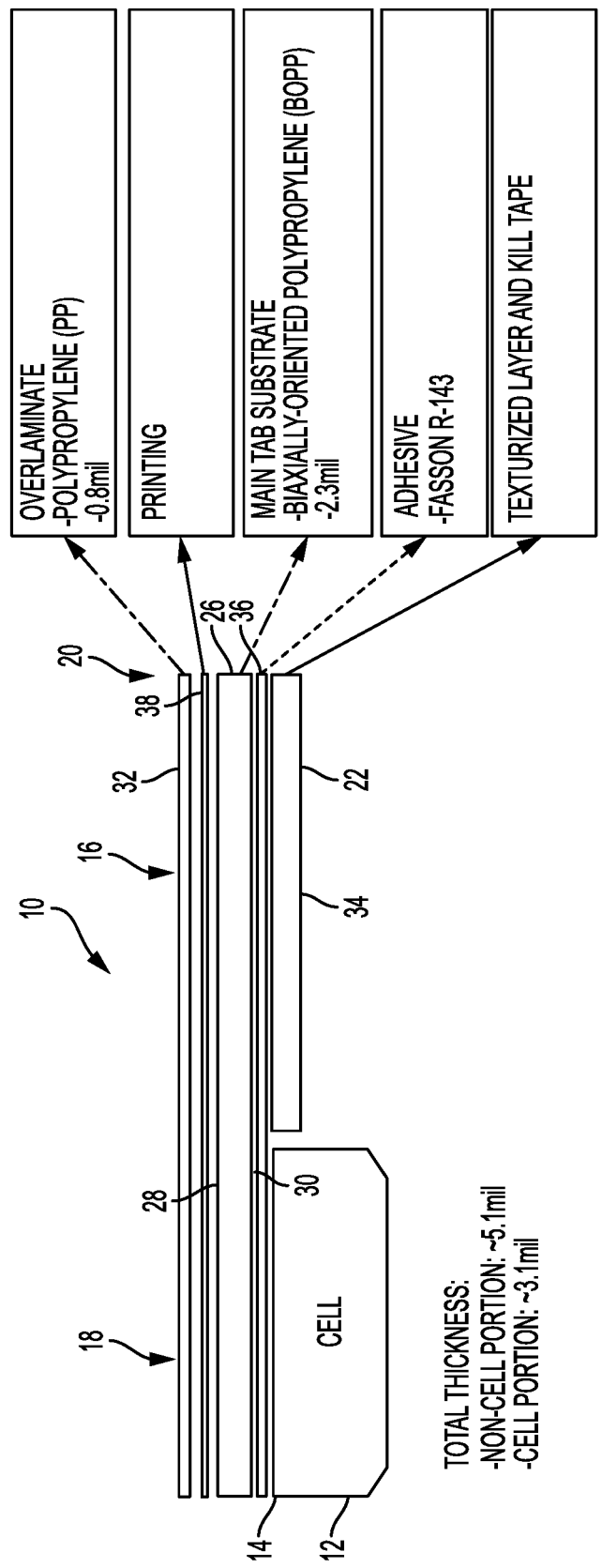
FIG. 2 is a schematic illustration of a battery assembly in accordance with an embodiment of the disclosure.
Figure 3:
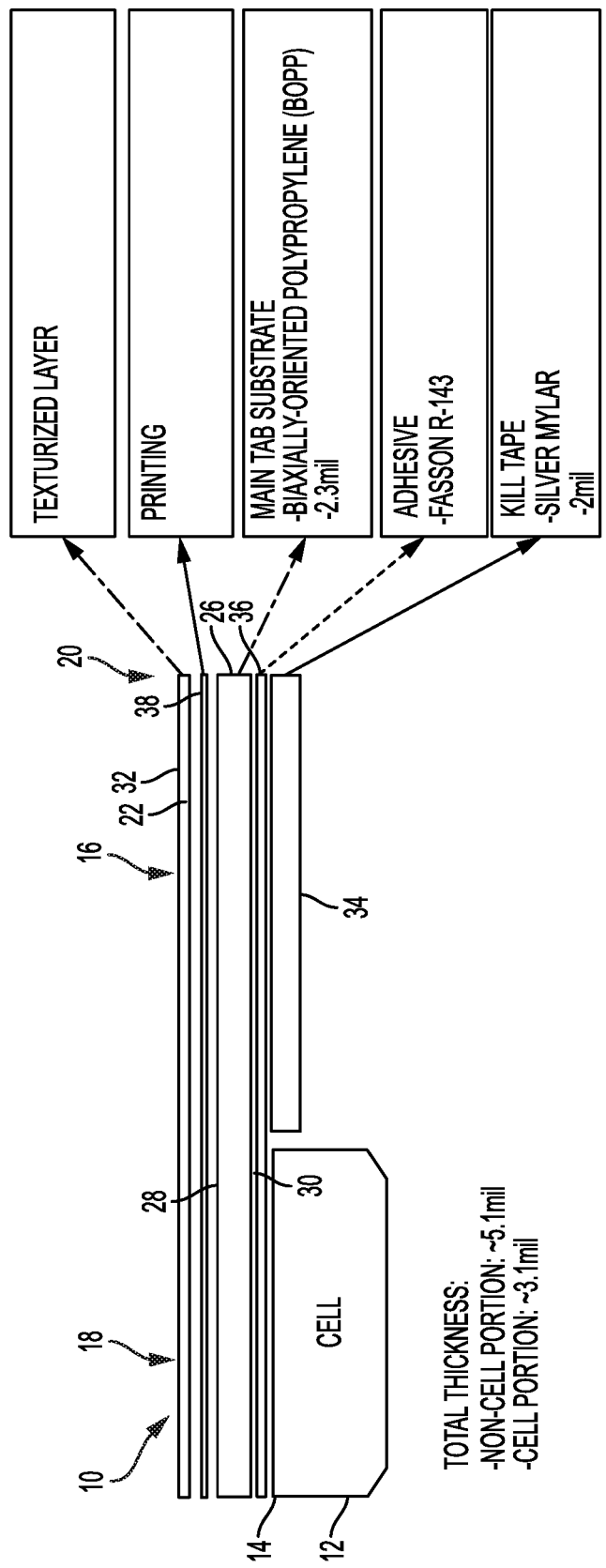
FIG. 3 is a schematic illustration of a battery assembly in accordance with another embodiment of the disclosure.

Referring to FIGS. 2 and 3, the removable tab 16 includes a battery cell attachment region 18 that is adhesively attached to the first surface 14 of the battery 12 and a texturized layer 22 providing an external face to the removable tab 16 such that a consumer can interact with the texturized layer external face when holding the removable tab 16. The texturized layer 22 is disposed at least in a gripping region 20 of the removable tab 16. The gripping region 20 is a portion of the removable tab 16 that is not coextensive with the battery cell attachment region 18. More specifically, the gripping region 20 does not overlap with any portion of the removable tab that is coextensive with the first surface 14 of the battery 12. The texturized layer 22 provides an improved gripping region 20 that advantageously eliminates the slippery surface of conventional removable tabs and provides a more secure grip on the tab 16 during battery replacement, thereby minimizing consumer frustration during insertion of the battery into a device such as a hearing aid.

Referring again to FIGS. 2 and 3, in accordance with an embodiment of the disclosure, the removable tab 16 can include a main tab layer 26 that has a first surface 28 and an oppositely disposed second surface 30. A first layer 32 is disposed over the first surface 28 of the main tab layer 26, and a second layer 34 is disposed over a portion of the second surface 30 of the main tab layer 26, in the gripping region 20. One or both of the first layer 32 and the second layer 34 is a texturized layer 22 that provides an external face to the removable tab 16 in at least the gripping region 20.

Figure 4:
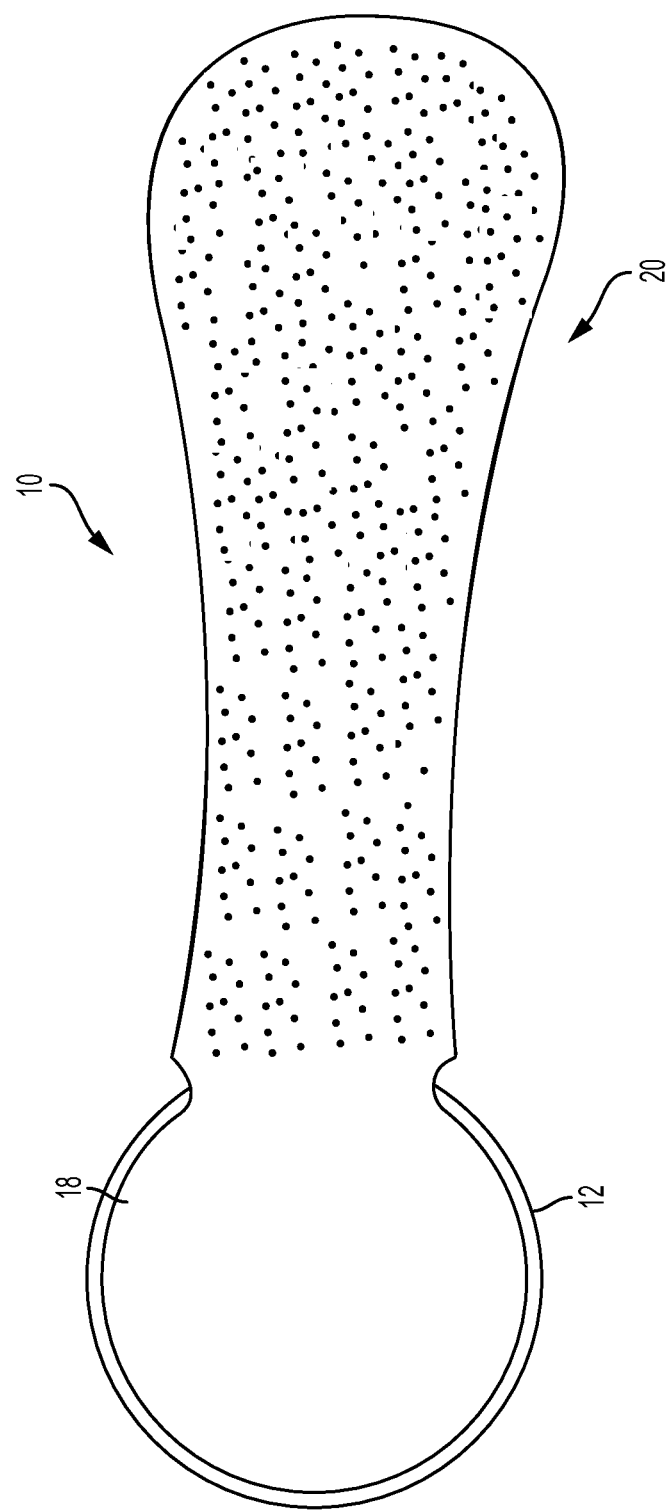
FIG. 4 is a top view of a battery assembly in accordance with an embodiment of the disclosure having a layer structure as illustrated in FIG. 3.
Figure 5:
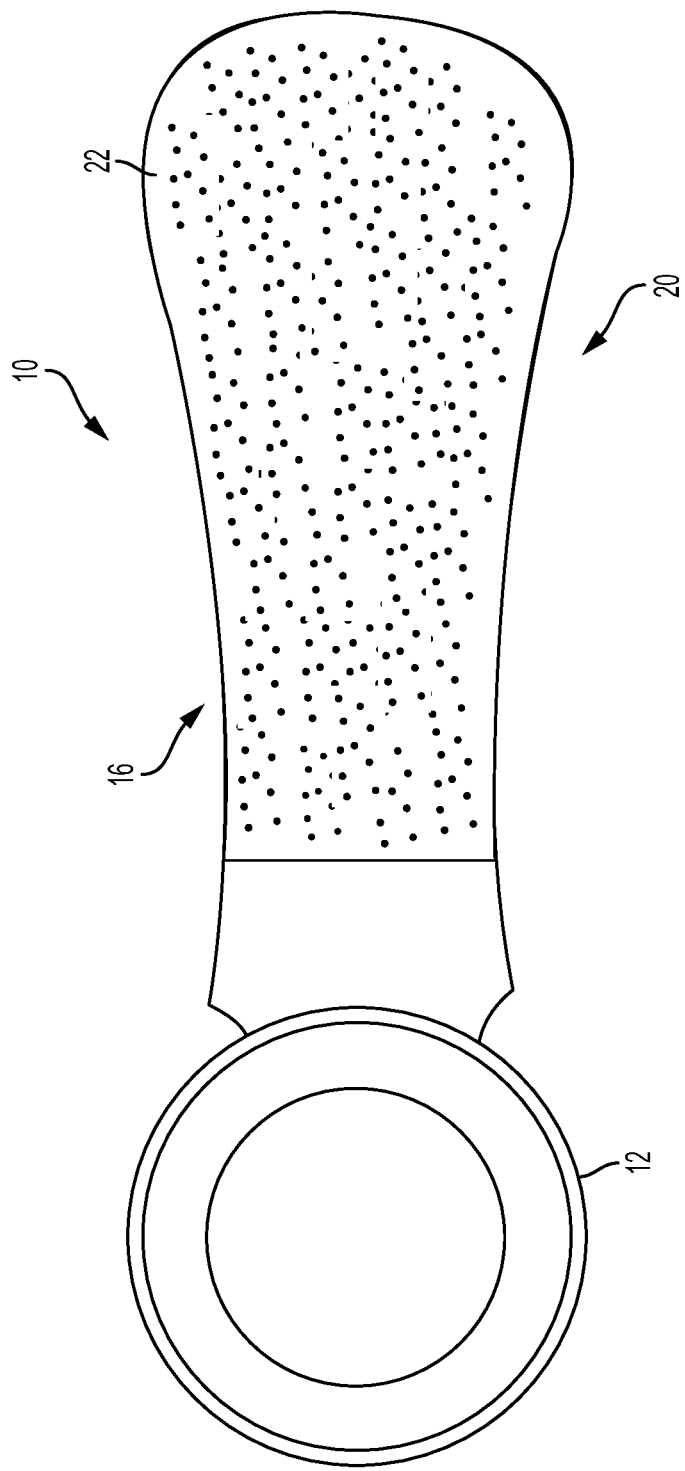
FIG. 5 is a bottom view of a battery assembly in accordance with an embodiment of the disclosure.
Figure 6:
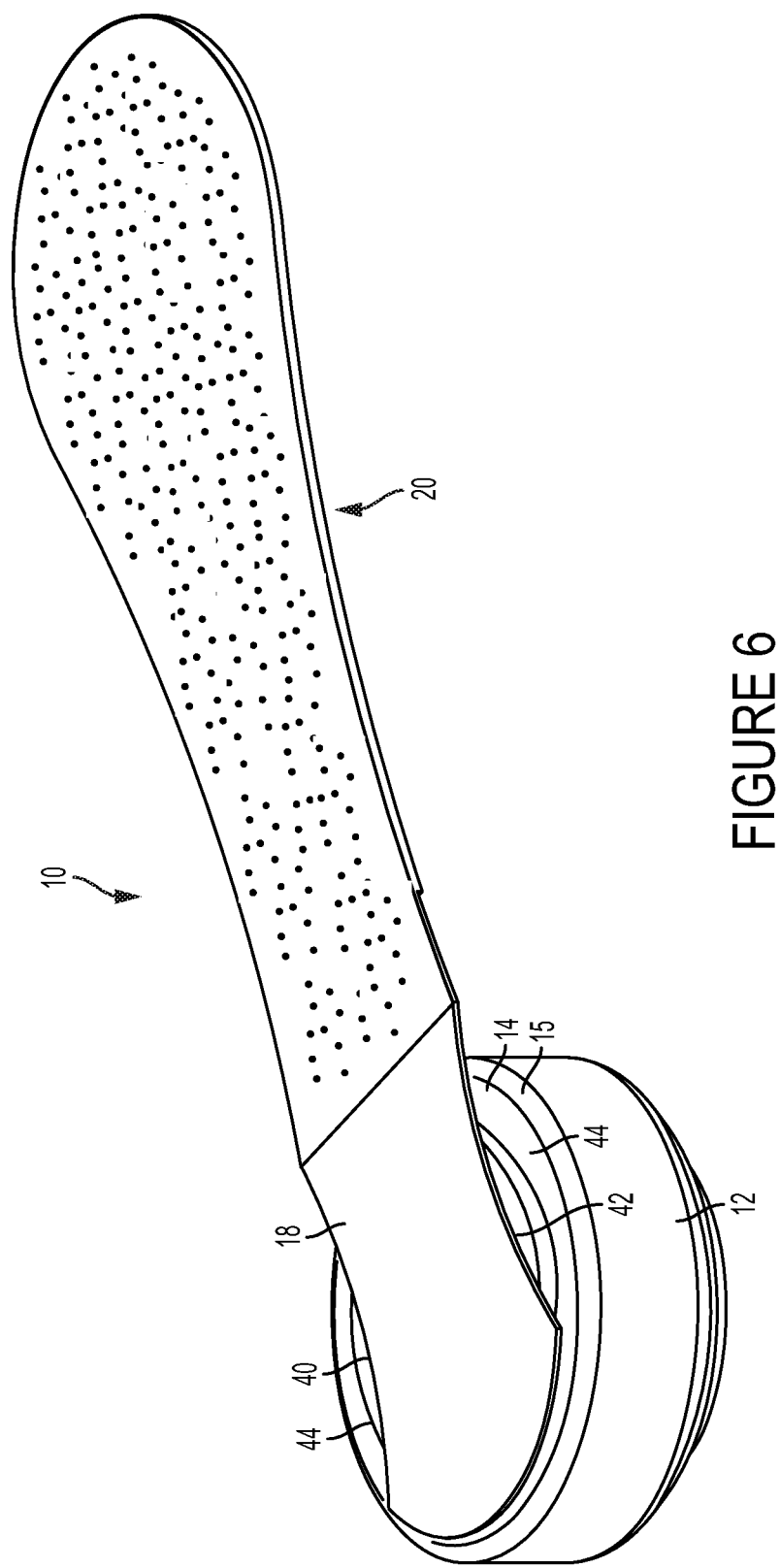
FIG. 6 is a perspective view of a battery assembly in accordance with an embodiment of the disclosure.
Figure 7:
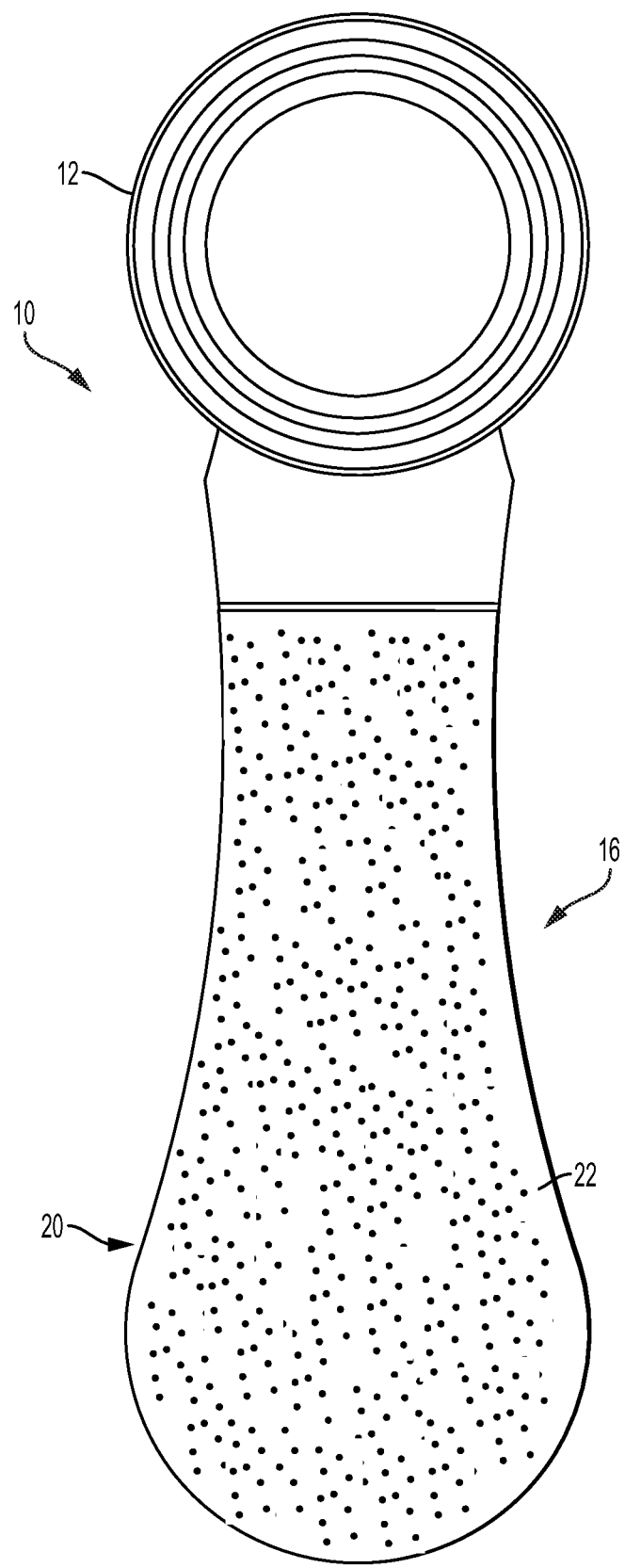
FIG. 7 is a bottom view of a battery assembly in accordance with an embodiment of the disclosure.

For example, referring to FIGS. 3 and 4, in an embodiment, the first layer 32 is or comprises the texturized layer 22. In such an embodiment, the second layer 34 can be substantially smooth. In another embodiment, referring to FIGS. 2 and 5, the second layer 34 is or comprises the texturized layer 22. In such an embodiment, the first layer 32 can be substantially smooth. In yet another embodiment, both the first and second layers 32, 34 comprise a texturized layer 22 or are themselves a texturized layer 22. In such an embodiment, the first and second layers 32, 34 can have the same or different texturization. For example, the first and second layers 32, 34 can have substantially the same average surface roughness when both layers 32, 34 are or comprise the texturized layer 22. Alternatively, the first and second layers 32, 34 can have different average surface roughness when both layers 32, 34 are or comprise the texturized layer 22.

In embodiments in which the first layer 32 or the second layer 34 is a smooth layer, the first or second layer 32, 34 can be a material selected from the group consisting of polypropylenes, polyethylene terephthalates, polyethylenes, polyvinyl acetates, a velvet layer, and combinations thereof. Other thermoplastic materials can also be used as the smooth layer. Additionally, a smooth varnish can be applied to any suitable material, or directly applied to the main tab layer 26, to provide a smooth surface for the first layer 32 and/or second layer 34.

The texturized layer 22 can have an average surface roughness of about 0.6 microns to about 6 microns, about 0.6 microns to 1 micron, about 0.8 microns to about 1.8 microns, about 1 micron to about 2 microns, about 0.7 microns to about 1.2 microns, about 0.8 microns to about 1 micron, about 0.6 microns to about 1.5 microns, about 1.5 microns to about 2 microns, about 1 micron to about 6 microns, about 2 microns to about 5 microns, about 3 microns to about 6 microns and about 1 micron to about 3 microns. Other suitable roughness includes about 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, and 6 microns.

The texturized layer 22 can be, for example, a layer to which an average surface roughness is applied or a layer having inherent surface roughness. For example, the texturized layer 22 can be or include a material selected from the group consisting of a woven, a rubberized material, plastics, foam, fiberglass/glass, paper, wax, foil, and combinations thereof which have inherent surface roughness. Alternatively or additionally, the surface roughness can be imparted by the addition of a coating, by abrading the material, or by embossing the material. For example, the texturization can be provided by applying an ink containing suspended particles to a surface. Suitable particles for use in the inks for achieving surface roughness include but are not limited to metallic particles, plastic particles, quartz particles, and ceramic particles. For example, in one embodiment, the particles can be high purity quartz. Generally, any particles can be used provided that they are not soluble in the ink. The particles can have any suitable diameter depending on the desired surface roughness to be imparted. For example, the particles can have an average diameter of about 5 µm to 50 µm, about 10 µm to about 20 µm, about 15 µm to about 30 µm, about 10 µm to about 30 µm, and about 25 µm to about 45 µm. Other suitable average particle diameters can be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 µm.

In various embodiments, the main tab layer 26 can include an adhesive layer 36 on the second surface 30 for attachment of the main tab layer 26 to the battery at least on the battery cell attachment region 18 of the removable tab 16 for attaching the tab 16 to the first surface 14 of the battery 12. Suitable adhesives for use as the adhesive layer 36 include but are not limited to pressure-sensitive adhesives, for example, acrylic-based pressure sensitive adhesive. In some embodiments, the adhesive layer 36 can be disposed, for example, across the entire length of the removable tab 16. The adhesive layer 36 can be covered in the gripping region 20 by the second layer 34 so that an undesirable sticky surface is not presented in the gripping region 20. In such embodiments, the second layer 34 can be a material selected from the group consisting of thermoplastic materials, biaxially oriented polyethylene terephthalate, polyethylene terephthalate, siliconized papers, poly-coated paper, polypropylene, biaxially oriented polypropylene film, polyolefins, and combinations thereof. In embodiments in which the second layer 34 is the texturized layer 22, texturization can be applied to such materials or a separate kill tape can be attached to the adhesive 36, to which the second layer 34 as the texturized layer 22 is then attached.

The main tab layer 26 can be or include any suitable materials conventionally used for battery tabs. For example, the main tab layer 26 can include thermoplastic materials. In an embodiment, the main tab layer 26 includes biaxially-oriented polypropylene, polypropylene, polyethylene terephthalate, biaxially-oriented polyethylene terephthalate, polyester, polyolefin, polyethylene, and coextrusions, laminates, and other combinations thereof. In all of the embodiments disclosed herein, the main tab layer 26 and particularly the battery cell attachment region 18 can be structured and arranged as described in U.S. Pat. No. 6,329,095, the disclosure of which is incorporated herein by reference in its entirety. In any of the embodiments disclosure herein, the tab can further include additional layers such as adhesive layers, tie layers, print layers, strength or rigidity enhancing layers, foam layers, and combinations thereof.

In various embodiments, the removable tab 16 can have a uniform thickness. In other embodiments, the removable tab 16 can have a variable thickness over the length of the tab. For example, the tab 16 can be thinner in or proximate to the battery cell attachment region 18 as compared to portions of the tab that are distal to the battery cell attachment region 18, for example, such as the gripping region 20. Variation in thickness can be provided, for example, by the addition of material. For example, the battery cell attachment region 18 can include only the main tab layer 26 and the adhesive layer 36, whereas the gripping region 20 can include at least a first layer 32, the main tab layer 26, the adhesive layer 36, and a second layer 34. In other embodiments, the battery cell attachment region 18 can include the main tab layer 26, the adhesive layer 36, and the first layer 32, but not the second layer 34, with the gripping region 20 having a greater thickness by virtue of additionally including the second layer 34.

In still further embodiments, the variation in thickness can be provided in the layers themselves. For example, the main tab layer 26 can have a varying thickness over its length. Thus, in various embodiments, the gripping region 20 can be provided with a variation in thickness across its length. In any of the embodiments having variations of tab thickness, the variation can be provided as a gradient over the length of the thickness, or as distinct, stepped changes in thickness over the length of the tab 16.

In various embodiments, the tab 16 can have an overall thickness of about 0.1 mm to about 1 mm, about 0.5 m to about 0.9 mm, about 0.2 mm to about 0.8 mm, about 0.4 mm to about 1 mm, about 0.3 mm to about 0.7 mm, or about 0.1 mm to about 0.5 mm. Other suitable thicknesses include about 0.1, 0.2, 0.3, 0.4, 0.5, 0.6, 0.7, 0.8, 0.9 and 1 mm.

The main tab layer 26 can have any suitable thickness. For example, the main tab layer 26 can have a thickness of about 1 mil to about 10 mils, about 2 mils to about 8 mils, about 3 mils to about 7 mils, about 5 mils to about 10 mils, about 4 mils to about 6 mils, or about 1 mil to about 5 mils. Other suitable thicknesses include, for example, about 1, 2, 3, 4, 5, 6, 7, 8, 9, and 10 mils.

The first layer 32 can have any suitable thickness. For example, the first layer 32 can have a thickness of about 0.2 mils to about 10 mils, about 0.5 mils to about 8 mils, about 1 mil to about 10 mils, about 2 mils to about 8 mils, about 3 mils to about 7 mils, about 5 mils to about 10 mils, about 4 mils to about 6 mils, or about 1 mil to about 5 mils. Other suitable thicknesses include, for example, about 0.2, 0.3, 0.4, 0.5, 0.6, 0.7, 0.8, 0.9, 1, 2, 3, 4, 5, 6, 7, 8, 9, and 10 mils.

The second layer 34 can have any suitable thickness. For example, the second layer 34 can have a thickness of about 1 mil to about 10 mils, about 2 mils to about 8 mils, about 3 mils to about 7 mils, about 5 mils to about 10 mils, about 4 mils to about 6 mils, or about 1 mil to about 5 mils. Other suitable thicknesses include, for example, about 1, 2, 3, 4, 5, 6, 7, 8, 9, and 10 mils. In an embodiment, the second layer has a thickness of greater than 2 mils.

The overall length of the tab 16 can vary depending on the battery 12 to which the tab 16 is to be attached. In general, the tab 16 can have a length of about 8 mm to about 40 mm, about 8 mm to about 15 mm, about 22 mm to 30 mm, about 25 mm to 35 mm, about 20 mm to 25 mm, and about 30 mm to about 35 mm. Other suitable lengths includes, for example, about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 mm.

The battery cell attachment region can have any suitable length depending on the battery size to which the tab is to be attached. In general, the battery cell attachment region can have a length that is the same as the diameter of the battery to which it is attached. Common hearing aid battery diameters include about 5.8 mm, 7.9 mm, and 11.6 mm. The battery cell attachment region 18 can have substantially the same or the same lengths in various embodiments. In general, the battery cell attachment region 18 can have a length of about 4 mm to about 15 mm, about 5 mm to about 10 mm, about 5.5 mm to about 12 mm, about 4 mm to about 8 mm, and about 10 mm to about 15 mm. Other suitable lengths include about 4, 5, 6, 7, 8, 9, 10, 11, 12, 13, 14, and 15 mm. In some embodiments, the battery cell attachment region 18 can extend in a parallel direction to the top surface of the battery cell, such that the length of the battery attachment region 18 is longer than the diameter of the battery cell to which it is attached or adapted to be attached, so as to further facilitate application of a peeling force to the battery cell attachment region 18 by twisting and/or pulling the removable tab 16 via the gripping region 20.

The gripping region 20 can also vary depending on the size of the battery to which the removable tab 16 is attached or adapted to be attached. For example, the gripping region 20 can have a length of about 2 mm to about 35 mm, about 2 mm to about 9 mm, about 4 mm to about 20 mm, about 10 mm to about 35 mm, about 15 mm to about 30 mm, about 10 mm to about 20 mm, about 15 mm to about 20 mm about 10 mm to about 15 mm, about 12 mm to about 18 mm, and about 13 mm to about 17 mm. Other suitable lengths include about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 mm.

For example, if the removable tab 16 is applied to a 675 size battery cell, the gripping region 20 can have a length as measured from the circumferential edge of the battery 12 of about 12.7 mm to about 19.1 mm, or about 15.9 mm. In another example embodiment, the tab 16 can be applied to a smaller size button cell such as a size 10 (which has a 5 mm diameter and a 3.5 mm height) or a size 13 (having a 7 mm diameter and 5 mm height) cell. The removable tab 16 can have the same gripping region length as for a 675 size cell, for example. Different removable tab lengths can also be provided.

Any number of additional layers can be included in the removable tab 16. For example, printing layers 38, tie layers, foam layers, structural enhancement layers, adhesive layers, cover layers, and other such known layers can be included in the removable tab 16 in one or both of the gripping region and the battery cell attachment region.

It has advantageously been found that newly applied removable tabs 16 in accordance with embodiments of the disclosure can demonstrate an at least 10% reduction in peel force as compared to a newly applied standard tab (control tab) having no texturization layer, but the same adhesive being used for attachment of the tab in the attachment region to a surface. Peel force is measured as the peak force applied during a 90° pull, at a constant rate/speed to remove the tab from the surface of the battery cell.

Referring to FIG. 4, in various embodiments, the battery cell attachment region 18 of the tab 16 can include first and second oppositely disposed sidewalls 40, 42. At least one of the sidewalls is disposed inwardly from a circumferential edge 15 of the battery 12 such that a portion 44 of the top surface 14 of the battery is exposed between the sidewall 40,42 of the tab 16 and the circumferential edge 15 of the battery 12. In yet another embodiment, any portion of the circumferential edge of the battery cell attachment region 18 can be disposed inwardly from the remaining portion of the circumferential edge to expose a portion 44 of the top surface 14 of the battery. This exposed surface 44 advantageously provides a region that the user can depress to maintain the battery 12 in the desired location while applying a peel force to remove the tab 16 from the battery 12, thereby further minimizing consumer frustration during insertion of the battery into a device such as a hearing aid.

The at least one sidewall 40, 42 can be curved inwardly towards a center of the battery 12 to provide the exposed region 44. In some embodiments, the curvature of the sidewall 40, 42 can substantially mirror the curvature of a finger, such as a thumb, when the finger is used to hold the battery in place after inserting the battery in a device such as a hearing aid. In various embodiments, as shown in the figures, both the first and second sidewalls 40, 42 are curved inwardly to provide two exposed surfaces 44 of the battery 12. For example, the radius of curvature of the first and/or second sidewall 40, 42 can be about 0.1 mm to about 10 mm, about 1 mm to about 5 mm, about 6 mm to about 10 mm, about 0.1 mm to about 1 mm, about 1 mm to about 8 mm, and about 0.3 mm to about 1.5 mm. Other suitable radius of curvature include about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, and 10 mm. Where both the first and second sidewalls 40, 42 are disposed inwardly to expose a portion 44 of the top surface, the first and second sidewalls 40, 42 can have the same or different radii of curvature.

About 5% to about 75% of the top surface of the battery 12 can be exposed, with the remaining portion of the top surface being covered by the removable tab 16. Other suitable amounts of exposed top surface 44 include about 10% to about 70%, about 15% to about 60%, about 5% to about 10%, about 10% to about 20%, about 5% to about 50%. For example, about 5, 10, 15, 20, 25, 30, 35, 40, 45, 50, 55, 60, 65, 70, or 75% of the battery top surface 44 can be exposed. The amount of exposed top surface 44 can depend in part, for example, on the type and size of battery. For example, the amount of exposed top surface 44 in metal/air batteries, which include holes (not shown) in the top surface that must be covered by the removable tab 16, may be dictated by the size and arrangement of the holes on the top surface.

EXAMPLES

Example 1: Roughness Measurements

The surface roughness of texturized tabs in accordance with embodiments of the disclosure was compared to control tabs having no texturization. The surface roughness was measured using a Mitutoyo Surftest sj-210 roughness instrument. Measurement was done in a single line over a 3 mm distance. The largest surface area region of the texturized tab, which depends on the tab size, was selected for the region of measurement. Tabs were obtained from a manufacturing roll and measurements were taking at the start, middle, and end of the manufacturing roll to assess consistency of the surface roughness along a manufacturing roll.

The tabs in accordance with embodiments of the disclosure and the control tabs included a main tab layer of biaxially-oriented polypropylene laminated with polypropylene and FASSON R-143 pressure sensitive adhesive. Tabs in accordance with embodiments of the disclosure included a texturization layer provided by printing the tab with an ink containing suspended particles. The ink included high purity quartz particles in a density of about 2.33 grams/milliter and with the particles having an average diameter of about 20 μm. The ink used was a water-based ink.

TABLE 1

Roughness Measurements

| Specimen | Battery Cell Size | Average Surface Roughness at Start (μm) | Average Surface Roughness at Middle (μm) | Average Surface Roughness at End (μm) |
|---|---|---|---|---|
| Control - Size 10 | 10 | 0.144 | 0.144 | 0.144 |
| Control - Size 13 | 13 | 0.121 | 0.121 | 0.121 |
| Control - Size 312 | 312 | 0.116 | 0.116 | 0.116 |
| Control - Size 675 | 675 | 0.131 | 0.131 | 0.131 |
| 10 texture 1 | 10 | 2.397 | 1.837 | 2.260 |
| 10 texture 2 | 10 | 2.214 | 2.549 | 2.268 |
| 10 texture 3 | 10 | 2.275 | 1.612 | 2.062 |
| 13 texture 1 | 13 | 3.275 | 1.691 | 2.874 |

TABLE 1-continued

Roughness Measurements

| Specimen | Battery Cell Size | Average Surface Roughness at Start (μm) | Average Surface Roughness at Middle (μm) | Average Surface Roughness at End (μm) |
|---|---|---|---|---|
| 13 texture 2 | 13 | 2.301 | 2.239 | 2.097 |
| 13 texture 3 | 13 | 1.980 | 2.171 | 2.027 |
| 312 texture 1 | 312 | 2.613 | 1.930 | 3.191 |
| 312 texture 2 | 312 | 2.163 | 2.392 | 2.507 |
| 312 texture 3 | 312 | 2.911 | 2.092 | 1.908 |
| 675 texture 1 | 675 | 2.183 | 2.027 | 2.085 |
| 675 texture 2 | 675 | 2.232 | 2.192 | 1.993 |
| 675 texture 3 | 675 | 1.953 | 2.073 | 2.054 |

Example 2: Peel Force Measurements

The peel force of texturized tabs in accordance with embodiments of the disclosure was tested against control tabs having no texturization. The adhesive materials of the adhesive layer attaching the tabs to the battery were the same in each of the tested samples. As shown in the tables below, the tabs in accordance with the disclosure demonstrated a significant reduction in peel force as compared to the control tabs.

The tabs in accordance with embodiment of the disclosure as well as the control tabs included a main tab layer of biaxially-oriented polypropylene laminated with polypropylene and FASSON R-143 pressure sensitive adhesive. Tabs in accordance with embodiments of the disclosure included a texturization layer provided by printing the tab with an ink containing suspended particles. The ink included high purity quartz particles in a density of about 2.33 particles/volume and with the particles having an average diameter of about 20 μm. The ink used was a water-based ink. The surface roughness of the tabs in accordance with the disclosure was a minimum of about 0.9 μm and a maximum of about 5 μm.

Peel force was tested as the peak load for a 90° pull at a constant rate/speed until removal of the tab form the surface of the battery. The testing was done in accordance with ASTM-D6862 with modification of the testing apparatus for tab peel from a battery as opposed to a plate.

TABLE 2

Size 312 Battery

| Specimen | Peak Load N | Specimen | Peak Load N |
|---|---|---|---|
| 312 control 1 | 0.64 | 312 texture 1 | 0.5 |
| 312 control 2 | 0.61 | 312 texture 2 | 0.58 |
| 312 control 3 | 0.71 | 312 texture 3 | 0.48 |
| 312 control 4 | 0.71 | 312 texture 4 | 0.5 |
| 312 control 5 | 0.58 | 312 texture 5 | 0.42 |
| 312 control 6 | 0.62 | 312 texture 6 | 0.58 |
| 312 control 7 | 0.83 | 312 texture 7 | 0.44 |
| 312 control 8 | 0.65 | 312 texture 8 | 0.45 |
| 312 control 9 | 0.69 | 312 texture 9 | 0.52 |
| 312 control 10 | 0.65 | 312 texture 10 | 0.47 |
| 312 control 11 | 0.88 | 312 texture 11 | 0.5 |
| 312 control 12 | 0.69 | 312 texture 12 | 0.48 |
| 312 control 13 | 0.67 | 312 texture 13 | 0.52 |
| 312 control 14 | 0.63 | 312 texture 14 | 0.52 |
| 312 control 15 | 0.62 | 312 texture 15 | 0.47 |
| 312 control 16 | 0.57 | 312 texture 16 | 0.52 |
| Average | 0.67 | Average | 0.50 |
| Standard Dev. | 0.08 | Standard Dev. | 0.04 |

TABLE 3

Size 13 Battery

| Specimen | Peak Load N | Specimen | Peak Load N |
|---|---|---|---|
| 13 control 1 | 0.74 | 13 texture 1 | 0.65 |
| 13 control 2 | 0.78 | 13 texture 2 | 0.53 |
| 13 control 3 | 0.81 | 13 texture 3 | 0.72 |
| 13 control 4 | 0.72 | 13 texture 4 | 0.55 |
| 13 control 5 | 0.69 | 13 texture 5 | 0.73 |
| 13 control 6 | 0.74 | 13 texture 6 | N/A* |
| 13 control 7 | 0.8 | 13 texture 7 | 0.65 |
| 13 control 8 | 0.63 | 13 texture 8 | 0.56 |
| 13 control 9 | 0.62 | 13 texture 9 | 0.56 |
| 13 control 10 | 0.91 | 13 texture 10 | 0.57 |
| 13 control 11 | 0.83 | 13 texture 11 | 0.62 |
| 13 control 12 | 0.78 | 13 texture 12 | 0.56 |
| 13 control 13 | 0.96 | 13 texture 13 | 0.46 |
| 13 control 14 | 0.71 | 13 texture 14 | 0.53 |
| 13 control 15 | 0.71 | 13 texture 15 | 0.69 |
| 13 control 16 | 0.73 | 13 texture 16 | 0.63 |
| Average | 0.76 | Average | 0.60 |
| Standard Dev. | 0.09 | Standard Dev. | 0.08 |

TABLE 4

Size 675 Battery

| Specimen | Peak Load N | Specimen | Peak Load N |
|---|---|---|---|
| 675 control 1 | 0.98 | 675 texture 1 | 1.19 |
| 675 control 2 | 1.17 | 675 texture 2 | 0.99 |
| 675 control 3 | 1.2 | 675 texture 3 | 0.91 |
| 675 control 4 | 1.02 | 675 texture 4 | 0.96 |
| 675 control 5 | 1.19 | 675 texture 5 | 0.96 |
| 675 control 6 | 1.26 | 675 texture 6 | 1.04 |
| 675 control 7 | 1.12 | 675 texture 7 | 1.01 |
| 675 control 8 | 1.1 | 675 texture 8 | 1.04 |
| 675 control 9 | 1.04 | 675 texture 9 | 1.06 |
| 675 control 10 | 1.23 | 675 texture 10 | 0.95 |
| 675 control 11 | 1.29 | 675 texture 11 | 1.01 |
| 675 control 12 | 1.1 | 675 texture 12 | 0.98 |
| Average | 1.14 | Average | 1.01 |
| Standard Dev. | 0.10 | Standard Dev. | 0.07 |

TABLE 5

Size 10 Battery

| Specimen | Peak Load N | Specimen | Peak Load N |
|---|---|---|---|
| 10 control 1 | 0.37 | 10 texture 1 | 0.3 |
| 10 control 2 | 0.33 | 10 texture 2 | 0.31 |
| 10 control 3 | 0.34 | 10 texture 3 | 0.23 |
| 10 control 4 | 0.38 | 10 texture 4 | 0.24 |
| 10 control 5 | 0.33 | 10 texture 5 | 0.19 |
| 10 control 6 | 0.33 | 10 texture 6 | 0.22 |
| 10 control 7 | 0.27 | 10 texture 7 | 0.19 |
| 10 control 8 | 0.32 | 10 texture 8 | 0.23 |
| 10 control 9 | 0.29 | 10 texture 9 | 0.25 |
| 10 control 10 | 0.30 | 10 texture 10 | 0.26 |
| 10 control 11 | 0.50 | 10 texture 11 | 0.21 |
| 10 control 12 | 0.32 | 10 texture 12 | 0.26 |
| 10 control 10 | 0.41 | 10 texture 10 | 0.24 |
| 10 control 14 | 0.34 | 10 texture 14 | 0.22 |
| 10 control 15 | 0.36 | 10 texture 15 | 0.27 |
| 10 control 16 | 0.33 | 10 texture 16 | 0.25 |
| Average | 0.35 | Average | 0.24 |
| Standard Dev. | 0.05 | Standard Dev. | 0.03 |

The tabs having the texturized layer in accordance with the disclosure demonstrated an at least 10% reduction in peel force. For size 312 batteries, the average reduction in average peel force resulting from the tabs of the disclosure was 50%, while the average reduction in peel force for size 675 and size 10 batteries was approximately 30%.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed:

1. A battery assembly, comprising:
   a battery having a first surface; and
   a removable tab attached to the first surface of the battery, the removable tab comprising:
   a main tab layer having a first surface and an oppositely disposed second surface, wherein the main tab layer comprises a battery cell attachment region and a gripping region adjacent to the battery cell attachment region;
   a first layer disposed over the first surface of the main tab layer;
   an adhesive layer disposed over the second surface of the main tab layer, the adhesive layer extending over both the battery cell attachment region and the gripping region; and
   a second layer disposed over the adhesive layer only at the gripping region, and
   wherein the second layer is a texturized layer comprising biaxially-oriented polyethylene terephthalate and having an average surface roughness of about 0.6 microns to about 6 microns, the texturized layer providing an external face to the removable tab.

2. The battery assembly of claim 1, wherein the battery is a metal/air battery.

3. The battery assembly of claim 2, wherein the metal/air battery is a zinc air button cell.

4. The battery assembly of claim 1, wherein the first layer is another texturized layer.

5. The battery assembly of claim 1, wherein the first layer is substantially smooth.

6. The battery assembly of claim 5, wherein the first layer comprises a material selected from the group consisting biaxially-oriented polypropylene, polypropylene, polyethylene terephthalate, biaxially-oriented polyethylene terephthalate, polyester, polyolefin, polyethylene, and coextrusions, laminates, and other combinations thereof.

7. The battery assembly of claim 1, wherein both the first layer and the second layer are texturized layers.

8. The battery assembly of claim 7, wherein the first and second layers have the same average surface roughness.

9. The battery assembly of claim 7, wherein the first and second layers have different average surface roughness.

10. The battery assembly of claim 1, wherein the texturized layer comprises a material selected from the group consisting of an abrasive coating, a printed material having an ink coating comprising suspended particles, and combinations thereof.

11. The battery assembly of claim 1, wherein the texturized layer is an embossed layer or an abraded layer.

12. The battery assembly of claim 1, wherein the tab is thicker in the gripping region as compared to the battery cell attachment region.

13. The battery assembly of claim 1, wherein the second layer has a thickness of about 1 mil to about 10 mils.

14. The battery assembly of claim 1, wherein the second layer has a thickness greater than 2 mils.

15. The battery assembly of claim 1, wherein the second layer is texturized by depositing a layer of ink containing suspended particles on the bottom surface.

16. The battery assembly of claim 15, wherein the suspended particles comprise plastic particles.

17. The battery assembly of claim 16, wherein the plastic particles have an average diameter of about 5 microns to about 50 microns.

18. A battery assembly comprising:
   a battery having a first surface; and
   a removable tab attached to the first surface of the battery, the removable tab comprising:
   a main tab layer having a first surface and an oppositely disposed second surface, wherein the main tab layer comprises a battery cell attachment region and a gripping region adjacent to the battery cell attachment region;
   a first layer disposed over the first surface of the main tab layer;
   an adhesive layer disposed over the second surface of the main tab layer, the adhesive layer extending over both the battery cell attachment region and the gripping region; and
   a second layer disposed over the adhesive layer only at the gripping region, and
   wherein one or both of the first layer and the second layer is a texturized layer having an average surface roughness of about 0.6 microns to about 6 microns, the texturized layer providing an external face to the removable tab, and
   wherein the main tab layer comprises first and second sidewalls in the battery cell attachment region, and at least one of the first and second sidewalls is curved inwardly, away from a circumferential edge of the battery such that a portion of the first surface of the battery is exposed between the circumferential edge of the battery and the at least one of the first and second sidewalls, when the battery cell attachment region is attached to the battery.

19. A removable tab for a battery cell, comprising:
   a main tab layer having a first surface and an oppositely disposed second surface, wherein the main tab layer comprises a battery cell attachment region and a gripping region adjacent to the battery cell attachment region;
   a first layer disposed over the first surface of the main tab layer;
   an adhesive layer disposed over the second surface of the main tab layer, the adhesive layer extending over both the battery cell attachment region and the gripping region; and
   a second layer disposed over the adhesive layer only at the gripping region, and
   wherein the second layer is a texturized layer comprising biaxially-oriented polyethylene terephthalate having an average surface roughness of about 0.6 microns to about 6 microns, the texturized layer providing an external face to the removable tab.

* * * * *

UNITED STATES PATENT AND TRADEMARK OFFICE
CERTIFICATE OF CORRECTION

| | |
|---|---|
| PATENT NO. | : 11,038,229 B2 |
| APPLICATION NO. | : 15/606585 |
| DATED | : June 15, 2021 |
| INVENTOR(S) | : Jean Mary Methe et al. |

It is certified that error appears in the above-identified patent and that said Letters Patent is hereby corrected as shown below:

In the Claims

Column 11, Line 2, Claim 6 "consisting" should be -- consisting of --.

Signed and Sealed this
Twenty-seventh Day of August, 2024

Katherine Kelly Vidal
*Director of the United States Patent and Trademark Office*